United States Patent

[11] 3,607,334

| [72] | Inventor | Eugene M. Fauber<br>Hammond, Ind. |
|---|---|---|
| [21] | Appl. No. | 725,188 |
| [22] | Filed | Apr. 29, 1968 |
| [45] | Patented | Sept. 21, 1971 |
| [73] | Assignee | Atlantic Richfield Company |

[54] COMPOSITIONS CONTAINING ASPHALT AND SECOND PASS FOOTS OIL
10 Claims, No Drawings

[52] U.S. Cl............................................................ 106/279, 106/282, 208/22
[51] Int. Cl............................................................ C08h 13/00, C08h 17/22, C08j 1/46
[50] Field of Search............................................... 106/273, 273 N, 278, 279, 284, 281; 208/3, 4, 5, 6, 11, 23, 44, 22

[56] References Cited
UNITED STATES PATENTS

| 2,069,927 | 2/1937 | Rhodes et al. ............... | 106/278 X |
| 2,327,752 | 8/1943 | Vandenberge ............... | 106/281 |
| 2,488,293 | 11/1949 | Hoiberg........................ | 208/5 |
| 2,627,498 | 2/1953 | Fink et al...................... | 208/4 |
| 2,774,724 | 12/1956 | Watson ......................... | 208/5 X V |
| 2,778,780 | 1/1957 | Romberg....................... | 208/4 |
| 2,877,128 | 10/1959 | Hardman....................... | 106/279 |

*Primary Examiner*—Julius Frome
*Assistant Examiner*—Joan B. Evans
*Attorney*—McLean, Morton & Boustead ABSTRACT: Asphaltic compositions are prepared which are suitable for use as felt saturants or as materials which may be airblown to suitable softening point and penetration for use as roofing material. These compositions comprise a major amount of asphalt and a minor amount of a second pass foots oil derived from a heavy lube distillate.

COMPOSITIONS CONTAINING ASPHALT AND SECOND PASS FOOTS OIL

This invention relates to o the production of novel asphaltic compositions comprising asphalt-foots oil combinations suitable, for example, for use as coating materials. More specifically, this invention relates to asphaltic compositions containing a minor amount of a second pass foots oil derived in the manufacture of high viscosity distillate lubricating oil.

It is well known in the art that asphaltic compositions can be airblown to higher softening points; however, in doing so, the needle penetration may be lowered below an acceptable value for some applications. For example, it is often desirable to use the same asphalt as a felt saturant and as the starting material in the air-blowing process for making roofing materials. These two uses, however, require asphaltic compositions having different properties. To be suitable for use as a felt saturant, asphalt advantageously has a softening point (R&B) of about 105° to 115° F. Desirable roofing asphalts have a softening point in the range of about 220° to 230° F. and a penetration at 77° F. of about 14 to 20. Asphalts which have a softening point in the range of about 105° to 115° F. and which are therefore satisfactory for use as felt saturants can often be airblown to softening points of about 220° to 230° F. for roofing applications. However, the resulting product frequently has a penetration below 14 and is therefore unsatisfactory for use as roofing material.

It is an object of this invention to provide an asphaltic composition suitable for use as a felt saturant and also as a starting material in the air-blowing process for making roofing material.

It is a further object of this invention to provide airblown asphaltic compositions having higher softening points and acceptable needle penetration values for use as roofing material, from the same material which is usable as a felt saturant.

These objects are accomplished in the present invention by combining an asphalt having for example a softening point in the range suitable for use as a felt saturant, with a minor amount of a second pass foots oil derived from deoiling slack wax removed from heavy lube distillate in the manufacture of high viscosity distillate lubricating oil. Such effective amounts of foots oil are often about 1 to 20 weight percent, preferably about 1 to 10 weight percent, based on the weight of the asphalt.

The foots oil of this invention is a byproduct in the production of high viscosity distillate lubricating oils and is the second foots oil fraction obtained from heavy slack wax. The foots oil often comprises about 55 to 65 weight percent n-paraffins, about 0–4 weight percent isoparaffins, about 30 to 45 weight percent naphthenes and less than about 1 percent aromatics. The foots oil can be prepared in the following manner. A waxy oil is fed to a crude still and various cuts are taken off including a cut called heavy lube distillate which is a primary source of the foots oil used in this invention and which boils primarily above about 750° F., preferably in the range of about 800° to 1000° F. with at least a 75° F. spread, and and A.P.I. gravity of about 22.5 to 24.5. This heavy lube distillate may advantageously be further refined to improve color stability by solvent extraction using, for example, phenol or furfural to remove aromatic type compounds. The heavy lube distillate or the raffinate from solvent treatment can be further refined by dewaxing often at relatively low temperatures of, for example, about −10° F., using various solvents or mixtures of solvents such as methyl ethyl ketone, benzene, acetone, and toluene to produce, after removal of the solvent, what is called a base lube oil stock and a heavy slack wax. The slack wax can be further refined to produce a deoiled slack wax and a first foots oil, for instance, by further solvent extraction, using the same solvents but at higher temperatures, e.g. about 45° F. as in the dewaxing step above or by sweating. Following removal of the first foots oil, the remaining slack wax can be further refined by solvent extraction with the same type solvents at about 50° F. or by sweating to produce the second pass foots oil of this invention. This second pass foots oil has a softening point of at least about 105° F. and can advantageously have a softening point in the same range as the asphaltic material with which it is combined so that when the foots oil is blended in effective amounts with the asphaltic material the softening point remains the same, for example about 105° to 115° F., which is satisfactory for use as a felt saturant. The composition of a typical second pass foots oil of this invention which has a softening point of about 108° F. is shown by the mass spectrometer analysis in Table I.

TABLE I

| | N-paraffin | Iso-1-paraffin | Naphthene | Aromatics |
|---|---|---|---|---|
| Carbon Number: | | | | |
| 25 | 0.0 | 0.0 | 0.0 | 0.0 |
| 26 | 0.0 | 0.0 | 0.3 | 0.0 |
| 27 | 2.5 | 0.0 | 1.4 | 0.0 |
| 28 | 3.4 | 0.0 | 2.4 | 0.0 |
| 29 | 3.8 | 0.0 | 3.4 | 0.0 |
| 30 | 4.4 | 0.0 | 4.2 | 0.0 |
| 31 | 4.5 | 0.0 | 5.0 | 0.0 |
| 32 | 6.0 | 0.0 | 5.3 | 0.0 |
| 33 | 9.6 | 0.0 | 4.5 | 0.0 |
| 34 | 10.4 | 0.0 | 3.8 | 0.0 |
| 35 | 7.4 | 0.3 | 3.5 | 0.0 |
| 36 | 9.0 | 0.5 | 3.3 | 0.0 |
| 37 | 0.0 | 0.6 | 0.0 | 0.0 |
| 38 | 0.0 | 0.5 | 0.0 | 0.0 |
| Total | 61.0 | 1.9 | 37.1 | 0.0 |

The blend of asphalt and second pass foots oil can the be airblown, e.g. at a temperature of about 425° F. to 600° F., preferably about 450° F. to 550° F., for a period sufficient to give an asphaltic product having the desired softening point which may be, for example about 210°–240° F., F., the range desired for roofing coating material, preferably about 220° to 230°F. F.

Two examples are shown in Table II of asphalts (A and B) with softening points (R&B, ASTM D36) of 105° to 115° F. which when airblown yield products of less than 14 penetration at 77° F. (ASTM D5) at a softening point of 220° to 230° F. Also shown in Table II are the penetration and softening points of products obtained by air-blowing compositions of these same asphalts (A and B) plus the second pass foots oil of this invention.

TABLE II

| | Softening point (R and B), °F. | Air-blown product | |
|---|---|---|---|
| | | Softening point (R and B), °F. | Penetration at 77° F. |
| Asphalt: | | | |
| A | 108 | 223 | 12 |
| B | 113 | 221 | 9 |
| Asphalt A blended with 3% 2d pass foots oil | 108 | 224 | 15 |
| Asphalt B blended with 8% 2d pass foots oil | 110 | 226 | 17 |

As may be seen Table II addition of the second pass foots oil of this invention to asphalts which without the foots oil could not be blown to both satisfactory softening point and penetration for use as roofing materials, yielded products which could be airblown to give compositions having a penetration and softening point within the range desired for use as a roofing material.

I claim:

1. An asphaltic composition having a softening point in the range of about 105° F. to 115° F., said composition consisting essentially of a major amount of asphalt having a softening point in the range of about 105° F. to 115° F. and between about 1 percent and 20 percent by weight of said asphalt of a second pass foots oil having a softening point of at least about 105° F., said second pass foots oil comprising about 55 percent 65 percent by weight of n-paraffins, about 0 percent to 4 percent by weight of isoparaffins, less than about 1 percent by weight of aromatics and about 30 percent to 45 percent by weight of naphthenes, and being derived from a slack wax removed from heavy lube distillate oil having an API gravity in the range of about 22.5 to 24.5.

2. The composition of claim 1, wherein said second pass foots oil has a softening point in the range of about 105° F. to 115°F.

3. The composition of claim 2, wherein said composition is capable of being airblown to a softening point in the range of about 210° F. to 240° F. and a needle penetration at 77° F. of about 14 to 20.

4. The composition of claim 3, wherein said composition is capable of being airblown to a softening point in the range of about 220° F. to 230° F.

5. The composition of claim 4, wherein said second pass foots oil is present in an amount in the range of about 1 percent to 10 percent by weight of said asphalt.

6. An asphaltic composition having a softening point of about 210° F. to 240° F. and a needle penetration at 77° F. of about 14 to 20, said composition consisting essentially of an airblown mixture of a major amount of asphalt and between about 1 percent and 20 percent by weight of said asphalt of a second pass foots oil, said asphalt having a softening point in the range of about 105° F. to 115° F., and derived from a slack wax removed from m heavy lube distillate oil having an API gravity of about 22.5 to 24.5, and comprising about 55 percent to 65 percent by weight of n-paraffins, about 0 percent to 4 percent by weight of isoparaffins, less than about 1 percent by weight of aromatics and about 30 percent to 45 percent of naphthenes.

7. The composition of claim 6, wherein said second pass foots oil has a softening point within the range of about 105° F. to 115° F.

8. The composition of claim 7, wherein said composition has a softening point of about 220°F. to 230°20F 9. The composition of claim 8, wherein said second pass foots oil is present in an amount of about 1 percent to 10 percent by weight of said asphalt.

10. The composition of claim 6, wherein prior to being airblown said mixture has a softening point in the range of about 105° F. to 115° F.

PO-1050
(5/69)

UNITED STATES PATENT OFFICE
CERTIFICATE OF CORRECTION

Patent No. 3,607,334　　　　　　　Dated　September 21, 1971

Inventor(s)　Eugene M. Fauber

It is certified that error appears in the above-identified patent and that said Letters Patent are hereby corrected as shown below:

Column 1, line 3, delete "o".

Column 2, line 32, delete "F.";
　　　　　line 54, after the word seen, insert --in--;
　　　　　line 70, after 55 percent, insert --to--.

Column 4, line 1, after 115°F., insert --said second pass foots oil having a softening point of at least about 105°F.--;
　　　　　line 2, delete "m";
　　　　　line 12, delete "230°20F" and insert in place thereof --230°F.--.

Signed and sealed this 6th day of June 1972.

(SEAL)
Attest:

EDWARD M. FLETCHER, JR.　　　　　ROBERT GOTTSCHALK
Attesting Officer　　　　　　　　Commissioner of Patents